US009729300B2

(12) United States Patent
Seo et al.

(10) Patent No.: US 9,729,300 B2
(45) Date of Patent: Aug. 8, 2017

(54) METHOD AND APPARATUS FOR CONTROLLING REMOTE TRANSMITTING STATION IN WIRELESS COMMUNICATION SYSTEM

(71) Applicants: LG ELECTRONICS INC., Seoul (KR); INDUSTRY-UNIVERSITY COOPERATION FOUNDATION SOGANG UNIVERSITY, Seoul (KR)

(72) Inventors: Inkwon Seo, Anyang-si (KR); Byounghoon Kim, Anyang-si (KR); Wonjin Sung, Seoul (KR); Jaewon Kim, Gimpo-si (KR); Jaeyong Park, Seoul (KR); Hyunggil Yoo, Seoul (KR)

(73) Assignees: LG ELECTRONICS INC., Seoul (KR); INDUSTRY-UNIVERSITY COOPERATION FOUNDATION SOGANG UNIVERSITY, Seoul (KR)

( * ) Notice: Subject to any disclaimer, the term of this patent is extended or adjusted under 35 U.S.C. 154(b) by 69 days.

(21) Appl. No.: 14/363,272

(22) PCT Filed: Dec. 6, 2012

(86) PCT No.: PCT/KR2012/010546
§ 371 (c)(1),
(2) Date: Jun. 5, 2014

(87) PCT Pub. No.: WO2013/085307
PCT Pub. Date: Jun. 13, 2013

(65) Prior Publication Data
US 2014/0348142 A1    Nov. 27, 2014

Related U.S. Application Data

(60) Provisional application No. 61/567,627, filed on Dec. 6, 2011.

(51) Int. Cl.
*H04L 5/00* (2006.01)
*H04J 11/00* (2006.01)
(Continued)

(52) U.S. Cl.
CPC ........ *H04L 5/0073* (2013.01); *H04J 11/0053* (2013.01); *H04L 5/0035* (2013.01);
(Continued)

(58) Field of Classification Search
CPC ....... H04B 7/024; H04B 7/026; H04W 16/24; H04W 16/32
See application file for complete search history.

(56) References Cited

U.S. PATENT DOCUMENTS 8,121,598 B2 * 2/2012 Hamel ................. H04W 24/02
455/435.1
8,295,837 B2 * 10/2012 Hamel ................. H04W 24/02
455/435.1
(Continued)

FOREIGN PATENT DOCUMENTS

JP          2011-91785 A      5/2011
KR    10-2005-0081136 A      8/2005
(Continued)

*Primary Examiner* — Alpus H Hsu
(74) *Attorney, Agent, or Firm* — Birch, Stewart, Kolasch & Birch, LLP

(57) ABSTRACT

The present invention relates to a method for controlling a remote transmitting station in a wireless communication system, including a step of: a first transmission point transmitting to a second transmission point time resource information related to at least one or more remote transmitting stations among a plurality of remote transmitting stations, wherein the plurality of transmitting stations located at cell edges of the first transmission point and cell identifiers of the
(Continued)

at least one or more remote transmitting stations are changed according to a time period instructed by the time resource information.

9 Claims, 15 Drawing Sheets

(51) Int. Cl.
*H04W 72/04* (2009.01)
*H04B 7/024* (2017.01)

(52) U.S. Cl.
CPC .......... *H04L 5/0053* (2013.01); *H04L 5/0092* (2013.01); *H04W 72/0426* (2013.01); *H04B 7/024* (2013.01); *H04L 5/0069* (2013.01); *H04W 72/0446* (2013.01)

(56) References Cited

U.S. PATENT DOCUMENTS

| | | | | |
|---|---|---|---|---|
| 8,331,929 B2* | 12/2012 | Brisebois | ............. | H04W 48/16 370/334 |
| 8,520,617 B2* | 8/2013 | Krishnamurthy | ... | H04W 72/082 370/329 |
| 8,649,797 B2* | 2/2014 | Lin | ............. | H04W 16/10 370/328 |
| 8,768,301 B2* | 7/2014 | Howard | ............. | H04W 64/003 370/338 |
| 8,953,507 B2* | 2/2015 | Lin | ............. | H04B 7/022 370/310 |
| 8,965,443 B2* | 2/2015 | Gao | ............. | H04W 74/004 370/252 |
| 9,084,246 B2* | 7/2015 | Lee | ............. | H04B 7/155 |
| 9,106,380 B2* | 8/2015 | Baldemair | ............. | H04L 5/001 |
| 9,107,173 B2* | 8/2015 | Gao | ............. | H04W 74/004 |
| 9,161,236 B2* | 10/2015 | Seo | ............. | H04W 24/00 370/328 |
| 9,179,396 B2* | 11/2015 | Wang | ............. | H04W 48/16 |
| 2005/0174954 A1 | 8/2005 | Yun et al. | | |
| 2009/0270107 A1 | 10/2009 | Lee et al. | | |
| 2010/0105395 A1* | 4/2010 | Ji | ............. | H04W 4/20 455/444 |
| 2010/0118827 A1* | 5/2010 | Sundaresan | ............. | H04W 72/04 370/330 |
| 2010/0165942 A1* | 7/2010 | Liao | ............. | H04L 5/005 370/329 |
| 2011/0009140 A1 | 1/2011 | Hwang et al. | | |
| 2011/0299488 A1 | 12/2011 | Kim et al. | | |
| 2012/0149358 A1* | 6/2012 | Lim | ............. | H04W 24/02 455/419 |
| 2012/0287799 A1* | 11/2012 | Chen | ............. | H04B 7/024 370/252 |
| 2012/0309291 A1 | 12/2012 | Sawai | | |
| 2012/0314686 A1* | 12/2012 | Huang | ............. | H04W 8/26 370/330 |
| 2013/0028109 A1* | 1/2013 | Jongren | ............. | H04W 24/10 370/252 |
| 2013/0039199 A1* | 2/2013 | Liao | ............. | H04B 7/0626 370/252 |
| 2013/0155990 A1* | 6/2013 | Nishio | ............. | H04L 5/0053 370/329 |
| 2013/0223258 A1* | 8/2013 | Seo | ............. | H04W 24/02 370/252 |
| 2014/0146680 A1* | 5/2014 | Wang | ............. | H04W 52/0206 370/236 |
| 2014/0211751 A1* | 7/2014 | Zhang | ............. | H04L 5/0044 370/330 |

FOREIGN PATENT DOCUMENTS

| | | |
|---|---|---|
| KR | 10-2009-0112911 A | 10/2009 |
| KR | 10-2010-0065565 A | 6/2010 |
| KR | 10-2011-0006006 A | 1/2011 |

* cited by examiner (a)          (b)

🗼 :MeNB (macro eNodeB)

US 9,729,300 B2

METHOD AND APPARATUS FOR CONTROLLING REMOTE TRANSMITTING STATION IN WIRELESS COMMUNICATION SYSTEM

CROSS REFERENCE TO RELATED APPLICATIONS

This application is the National Phase of PCT/KR2012/01546 filed on Dec. 6, 2012, which claims priority under 35 U.S.C. 119(e) to U.S. Provisional Application No. 61/567,627 filed on Dec. 6, 2011, all of which are incorporated by reference herein in its entirety.

TECHNICAL FIELD

The present invention relates to a wireless communication system, and more particularly, to a method of controlling a remote transmitting station and apparatus therefor.

BACKGROUND ART

Wireless communication systems have been widely deployed to provide various types of communication services such as voice or data services. Generally, a wireless communication system is a multiple access system capable of supporting communication with multiple users by sharing available system resources (bandwidth, transmit power, etc.). Multiple access systems include, for example, a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, a multi carrier frequency division multiple access (MC-FDMA) system, etc.

DISCLOSURE OF THE INVENTION

Technical Task

The technical task of the present invention is to disclose technologies relating to a method of controlling a remote transmitting station located on a cell edge in a heterogeneous network environment.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In a $1^{st}$ technical aspect of the present invention, provided herein is a method of controlling a remote transmitting station in a wireless communication system, including the step of transmitting time resource information related to at least one of a plurality of remote transmitting stations to a $2^{nd}$ transmission point from a $1^{st}$ transmission point, wherein a plurality of the remote transmitting stations are located on a cell edge of the $1^{st}$ transmission point and wherein a cell identifier of the at least one remote transmitting station is changed depending on a time interval indicated by the time resource information.

In a $2^{nd}$ technical aspect of the present invention, provided herein is a $1^{st}$ transmission point device in a wireless communication system, including a transmitting module and a processor transmitting time resource information related to at least one of a plurality of remote transmitting stations to a $2^{nd}$ transmission point, wherein a plurality of the remote transmitting stations are located on a cell edge of the $1^{st}$ transmission point and wherein a cell identifier of the at least one remote transmitting station is changed depending on a time interval indicated by the time resource information.

The following matters may be included in the $1^{st}$ and $2^{nd}$ technical aspects of the present invention.

If the timer interval is provided for occupation of the at least one remote transmitting station of the $1^{st}$ transmission point, the cell identifier of the at least one remote transmitting station may be set equal to that of the $1^{st}$ transmission point. The cell identifier of the at least one remote transmitting station may be set identical to that of the $2^{nd}$ transmission point in a time interval other than the time interval indicated by the time resource information. The at least one remote transmitting station may perform a cooperative transmission with the $1^{st}$ transmission point in the time interval.

The $1^{st}$ transmission point may transmit a cell identifier of a transmission point corresponding to the time interval to the at least one remote transmitting station.

The time interval may be repeated by a preset period.

The $1^{st}$ transmission point may further transmit at least one of an information related to a transmission of a physical downlink shared channel and a signal transmission information to the at least one remote transmitting station. The information related to the physical downlink shared channel may include at least one of a cell-specific reference signal related information of the $1^{st}$ transmission point and a start OFDM symbol or channel state information reference signal related information of a control channel. The signal transmission information may include at least one of a channel state information and a transmission mode or antenna port information.

The at least one remote transmitting station may be located on a cell edge of the $2^{nd}$ transmission point among a plurality of the remote transmitting stations.

If the at least one remote transmitting station performs a joint transmission with the $1^{st}$ transmission point, the $1^{st}$ transmission point may transmit an information on an antenna port to be used by the at least one remote transmitting station. In this case, the $1^{st}$ transmission point may instruct a user equipment adjacent to the at least one remote transmitting station to separately perform a channel state reporting for the antenna port.

Advantageous Effects

According to the present invention, overall system throughput can be enhanced through enhancement of qualities of received signals of user equipments located on a cell edge, interference controls of the user equipments, and the like.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

Figure 1:
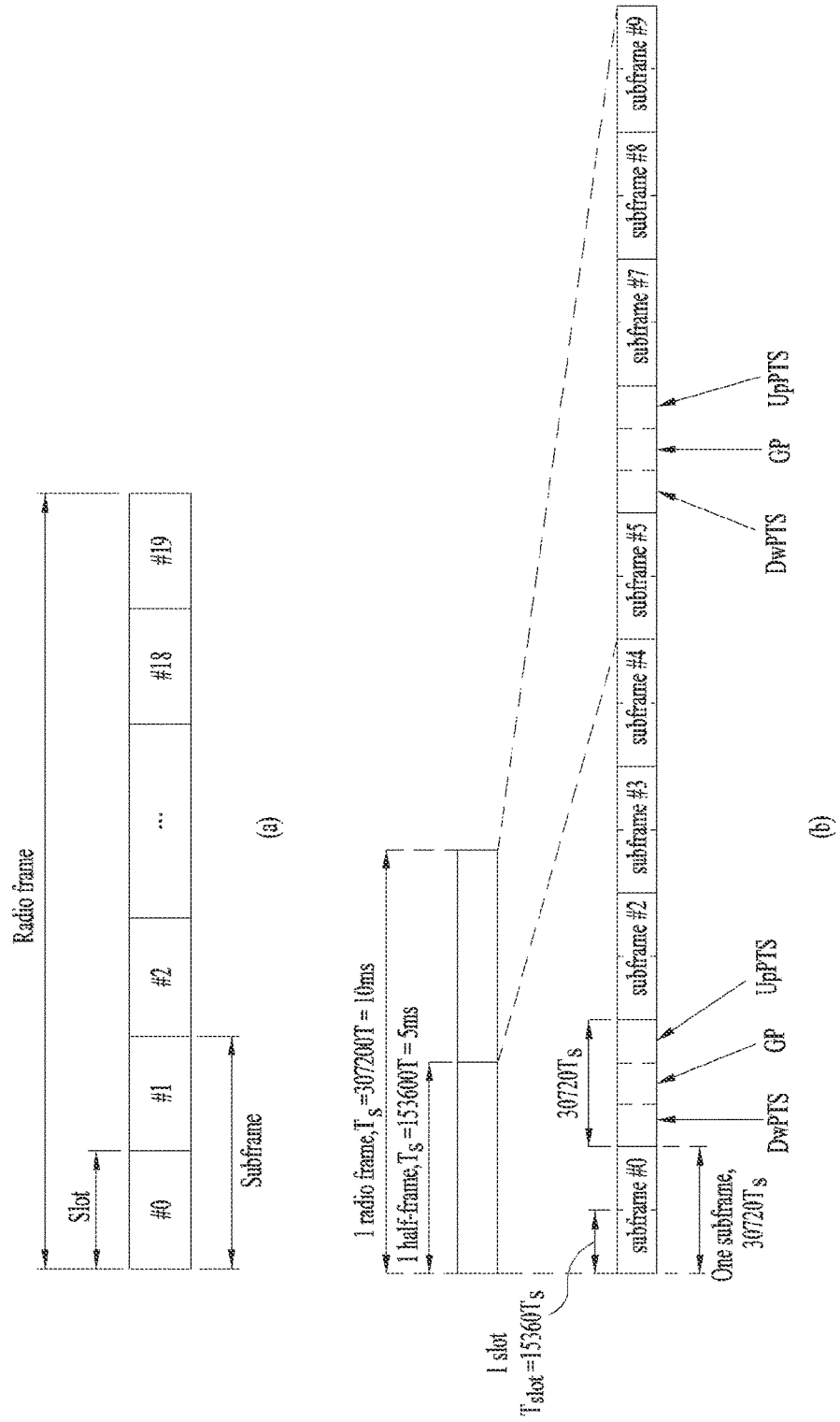
FIG. 1 including (a) and (b) is a diagram for a structure of a radio frames.

First of all, the following embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, an embodiment of the present invention may be implemented by combining elements and/or features together in part. A sequence of operations explained for each embodiment of the present invention may be modifiable. Some configurations or features of one embodiment may be included in another embodiment or substituted with corresponding configurations or features of another embodiment.

In this specification, embodiments of the present invention are described centering on the data transmission/reception relations between a base station and a terminal. In this case, the base station may be meaningful as a terminal node of a network which directly performs communication with the terminal. In this disclosure, a specific operation explained as performed by a base station may be performed by an upper node of the base station in some cases.

In particular, in a network constructed with a plurality of network nodes including a base station, it is apparent that various operations performed for communication with a terminal can be performed by a base station or other networks except the base station. 'Base station (BS)' may be substituted with such a terminology as a fixed station, a Node B, an eNode B (eNB), an access point (AP) and the like. A relay may be substituted with such a terminology as a relay node (RN), a relay station (RS) and the like. And, 'terminal' may be substituted with such a terminology as a user equipment (UE), a mobile station (MS), a mobile subscriber station (MSS), a subscriber station (SS) and the like.

Specific terminologies used for the following description may be provided to help the understanding of the present invention. And, the use of the specific terminology may be modified into other forms within the scope of the technical idea of the present invention.

Occasionally, to avoid obscuring the concept of the present invention, structures and/or devices known to the public may be skipped or represented as block diagrams centering on the core functions of the structures and/or devices. Wherever possible, the same reference numbers will be used throughout the drawings to refer to the same or like parts in this specification.

Embodiments of the present invention may be supported by the disclosed standard documents of at least one of wireless access systems including IEEE 802 system, 3GPP system, 3GPP LTE system, and 3GPP LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) is an evolved version of 3GPP LTE. WiMAX may be explained by IEEE 802.16e standard (e.g., WirelessMAN-OFDMA reference system) and advanced IEEE 802.16m standard (e.g., WirelessMAN-OFDMA advanced system). For clarity, the following description mainly concerns 3GPP LTE system or 3GPP LTE-A system, by which the technical idea of the present invention may be non-limited.

A structure of a downlink radio frame is described with reference to FIG. 1 as follows.

In a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

FIG. 1 showing (a) is a diagram for a structure of a downlink radio frame of type 1. A DL (downlink) radio frame includes 10 subframes. Each of the subframes includes 2 slots. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain or may include a plurality of resource blocks (RBs) in frequency domain. Since 3GPP system uses OFDMA in downlink, OFDM symbol indicates one symbol duration. The OFDM symbol may be named SC-FDMA symbol or symbol duration. Resource block (RB) is a resource allocation unit and may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel state is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first 2 or 3 OFDM symbols of each subframe may be allocated to PDCCH (physical downlink control channel), while the rest of the OFDM symbols are allocated to PDSCH (physical downlink shared channel).

FIG. 1 showing (b) is a diagram for a structure of a downlink radio frame of type 2. A type-2 radio frame includes 2 half frames. Each of the half frame includes 5 subframes, DwPTS (downlink pilot time slot), GP (guard period) and UpPTS (uplink pilot time slot). And, one of the subframes includes 2 slots. The DwPTS is used for initial cell search, synchronization or channel estimation in a user equipment. The UpPTS is used for channel estimation in a base station and uplink transmission synchronization of a user equipment. The guard period is a period for eliminating interference generated in uplink due to multi-path delay of a downlink signal between uplink and downlink. Meanwhile, one subframe includes 2 slots irrespective of the type of the radio frame.

The above-described structures of the radio frame are just exemplary. And, the number of subframes included in a radio frame, the number of slots included in the subframe and the number of symbols included in the slot may be modified in various ways.

Figure 2:
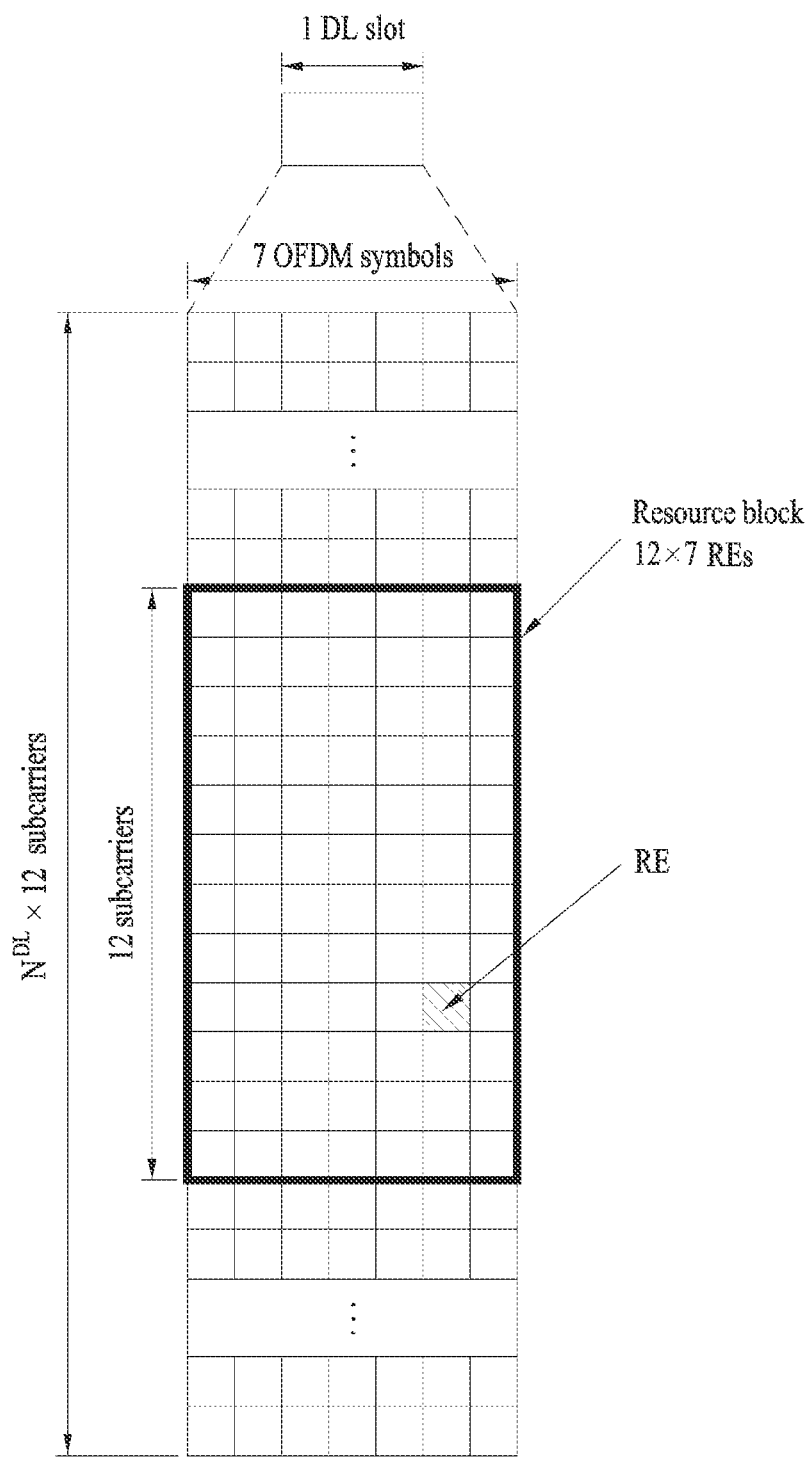
FIG. 2 is a diagram of a resource grid in a downlink slot.
Figure 4:
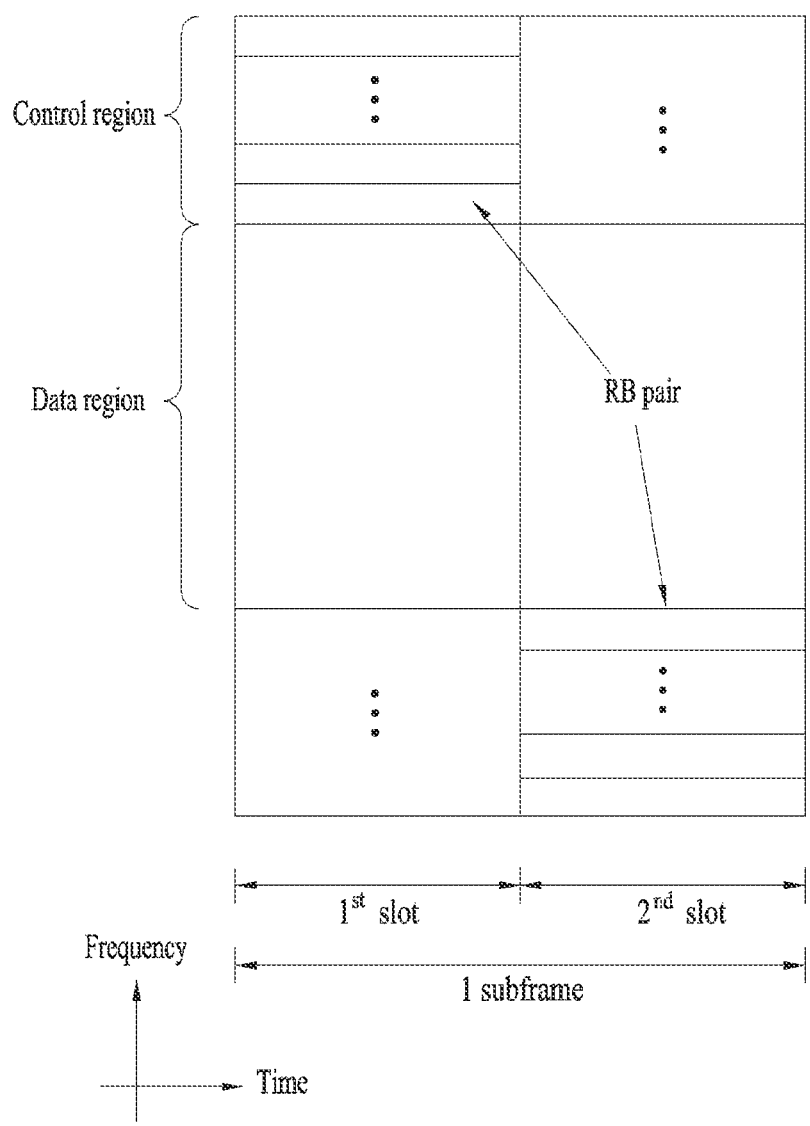
FIG. 4 is a diagram for a structure of an uplink subframe.

FIG. 2 is a diagram of a resource grid in a downlink (DL) slot. Referring to FIG. 4, one downlink (DL) slot may include 7 OFDM symbols and one resource block (RB) may include 12 subcarriers, by which the present invention may be non-limited. For instance, in case of a normal cyclic prefix (CP), one slot includes 7 OFDM symbols. Yet, in case of an extended CP, one slot may include 6 OFDM symbols. Each element on a resource grid may be named a resource element (hereinafter abbreviated RE). One resource block includes 12×7 resource elements. The number $N^{DL}$ of resource blocks included in a DL slot may depend on a DL transmission bandwidth. And, the structure of an uplink (UL) slot may be identical to that of the DL slot.

Figure 3:
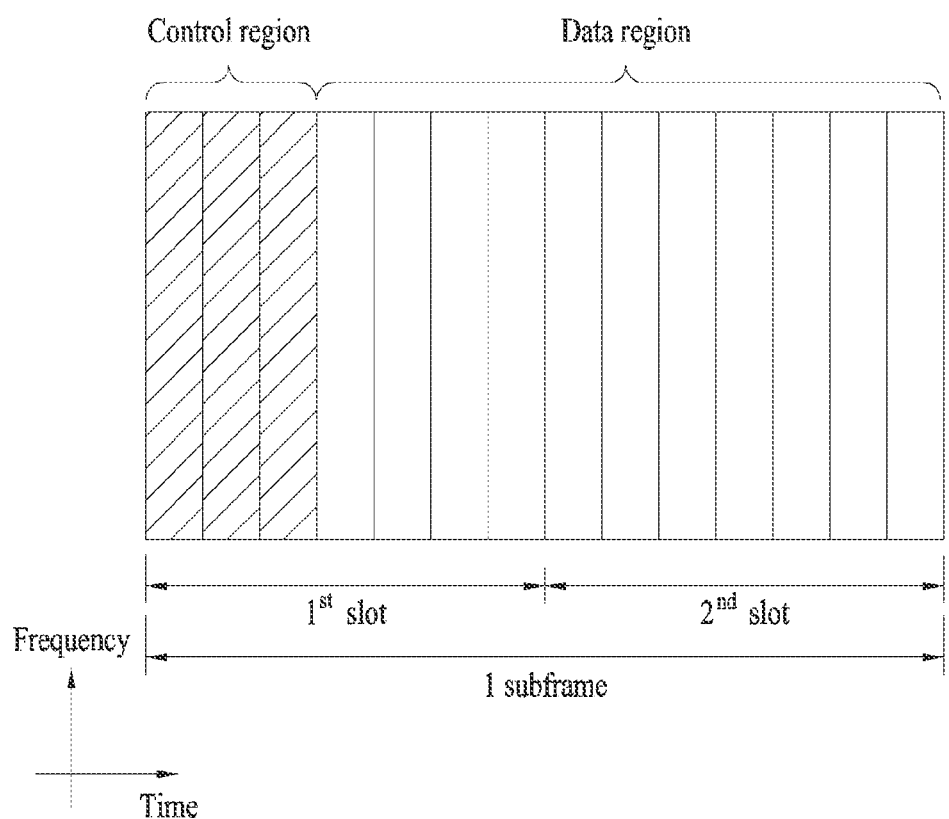
FIG. 3 is a diagram for a structure of a downlink subframe.

FIG. 3 is a diagram for a structure of a downlink (DL) subframe. Maximum 3 OFDM symbols situated in a head part of a first slot of one subframe correspond to a control region to which a control channel is allocated. The rest of OFDM symbols correspond to a data region to which PDSCH (physical downlink shared channel) is allocated. A basic unit of transmission becomes one subframe. In particular, PDCCH and PDSCH are assigned across 2 slots. Examples of DL control channels used by 3GPP LTE system may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and includes information on the number of OFDM symbols used for a transmission of a control channel within the subframe. The PHICH includes HARQ ACK/NACK signal in response to a UL transmission. Control information carried on PDCCH may be called downlink control information (DCI). The DCI may include UL or DL scheduling information or a UL transmission power control command for a random UE (user equipment) group. The PDCCH may include transmission format and resource allocation information of DL-SCH (downlink shared channel), resource allocation information on UL-SCH (uplink shared channel), paging information on PCH (paging channel), system information on DL-SCH, resource allocation of such a higher layer control message as a random access response transmitted on PDSCH, transmission power control command set for individual UEs within a random UE group, transmission power control information, activation of VoIP (voice over IP) and the like. A plurality of PDCCHs can be transmitted within the control region. A user equipment may be able to monitor a plurality of the PDCCHs. The PDCCH is transmitted as an aggregation of at least one or more contiguous CCEs (control channel elements). The CCE is a logical allocation unit used to provide the PDCCH at a coding rate based on a radio channel state. The CCE may correspond to a plurality of REGs (resource element groups). A format of the PDCCH and the number of available PDCCH bits may be determined in accordance with correlation between the number of CCEs and a coding rate provided by the CCE. A base station determines a PDCCH format in accordance with a DCI which is to be transmitted to a user equipment and attaches a CRC (cyclic redundancy check) to control information. The CRC is masked with an identifier named RNTI (radio network temporary identifier) in accordance with an owner or usage of the PDCCH. For instance, if the PDCCH is provided for a specific user equipment, the CRC may be masked with an identifier (e.g., cell-RNTI (C-RNTI)) of the corresponding user equipment. In case that the PDCCH is provided for a paging message, the CRC may be masked with a paging indicator identifier (e.g., P-RNTI). If the PDCCH is provided for system information (particularly, for a system information block (SIC)), the CRC may be masked with a system information identifier and a system information RNTI (SI-RNTI). In order to indicate a random access response to a transmission of a random access preamble of a user equipment, the CRC may be masked with RA-RNTI (random access-RNTI).

FIG. 4 is a diagram for a structure of an uplink (UL) subframe. A UL subframe may be divided into a control region and a data region in frequency domain. A physical UL control channel (PUCCH) including UL control information may be allocated to the control region. And, a physical UL shared channel (PUSCH) including user data may be allocated to the data region. In order to maintain single carrier property, one user equipment does not transmit PUCCH and PUSCH simultaneously. PUCCH for one user equipment may be allocated to a resource block pair (RB pair) in subframe. Resource blocks belonging to the resource block pair may occupy different subcarriers for 2 slots, which can be expressed as a resource block pair allocated to PUCCH frequency-hop a slot boundary.

Heterogeneous Network Environment (Heterogeneous Deployments)

Figure 5:
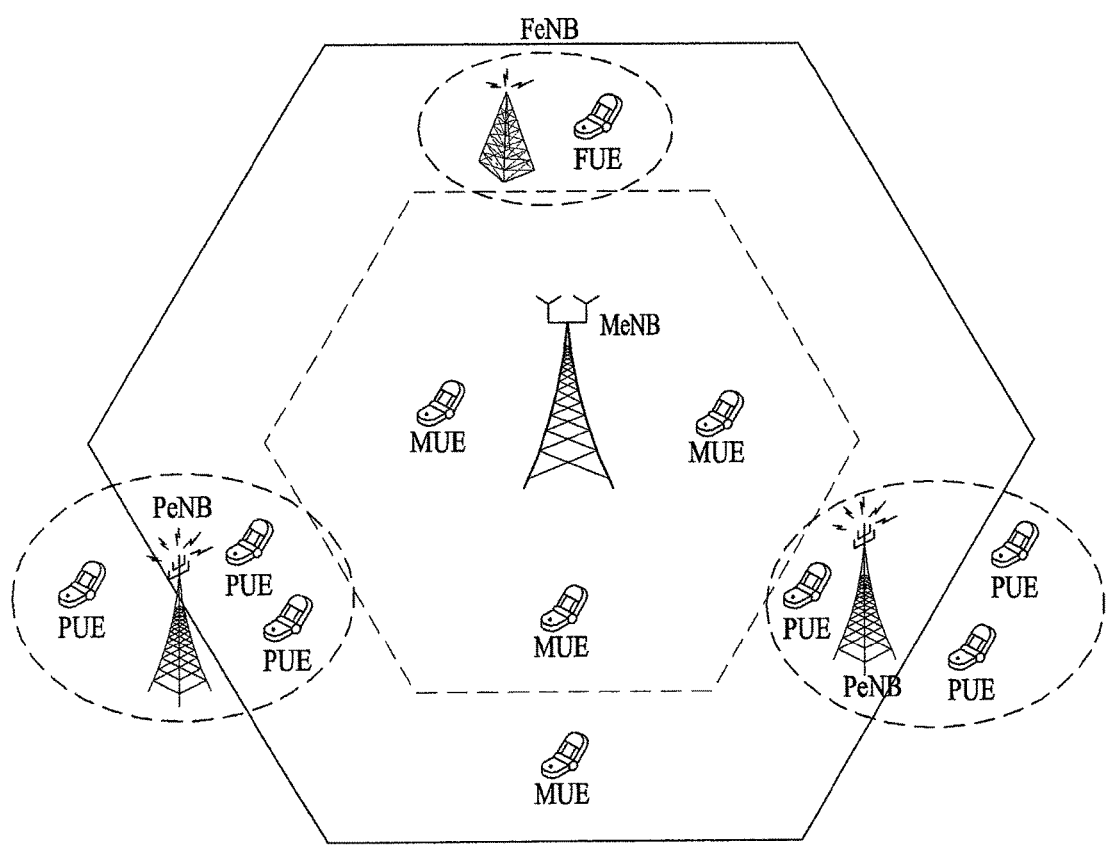
FIG. 5 is a diagram to describe a heterogeneous network environment.

FIG. 5 is a diagram of a heterogeneous network wireless communication system including a macro base station (MeNB) and a micro base station (PeNB or FeNB). In the present document, a terminology 'heterogeneous network (Het Net)' means a network in which a macro base station (MeNB) and a micro base station (PeNB or FeNB) coexist despite using the same RAT (radio access technology).

A macro base station (MeNB) means a general base station of a wireless communication system with a wide coverage and high transmission power. And, the macro base station (MeNB) can be called a macro cell.

A micro base station (PeNB or FeNB) can be named a micro cell, a pico cell, a femto cell, a home eNB (HeNB), a relay or the like for example (each of the micro base station and the macro base station can be generally called a transmission point). The micro base station (PeNB or FeNB) is a small-scale version of the macro base station (MeNB) and is able to operate independently by performing most of the functions of the macro base station. And, the micro base station (PeNB or FeNB) is a base station that can be installed in an area covered by the macro base station, or a base station of a non-overlay type that can be installed in a radio shadow area the base station is unable to cover. Moreover, the micro base station (PeNB or FeNB) has a coverage narrower than that of the macro base station (MeNB) and a transmission power lower than that of the macro base station (MeNB) and is able to accommodate user equipments of which number is smaller than that of the macro base station (MeNB).

A user equipment (hereinafter named a macro-UE) can be directly served by a macro base station (MeNB). And, a user equipment (hereinafter named a micro-UE: PUE or FUE) can be served by a micro base station (PeNB or FeNB). In some cases, a user equipment (hereinafter abbreviated UE) existing within a coverage of a micro base station (MeNB) can be served by a macro base station (PeNB or FeNB).

Micro base stations can be categorized in to two kinds of types depending on whether an access of a user equipment is restricted.

A $1^{st}$ type corresponds to an OSG (open access subscriber group) or non-CSG (non-closed access subscriber group) base station and includes a cell that allows an access of an existing macro-UE or an access of a micro-UE of another micron base station. The existing macro-UE or the like is able to make a handover into a base station of the OSG type.

A $2^{nd}$ type corresponds to a CSG base station and does not allow an access of an existing macro-UE or an access of a micro-UE of another micron base station. Hence, the $2^{nd}$ type is unable to make a handover into the VSG base station.

Coordinated Multi-Point (CoMP)

In accordance with the advanced system performance requirements of 3GPP LTE-A system, CoMP transmission/reception scheme (represented as one of co-MIMO (collaborative MIMO), network MIMO, etc.) has been proposed. The CoMP technology can enhance performance of a user equipment located at a cell edge and increase average sector throughput as well.

Generally, in a multi-cell environment having a frequency reuse factor set to 1, the performance and average sector throughput of the user equipment located at the cell edge may be lowered due to inter-cell interference (ICI). In order to reduce the ICI, a conventional LTE system has applied a method of providing an appropriate throughput performance to a user equipment located at a cell edge in an environment restricted by interference using a simple passive scheme such as FFR (fractional frequency reuse) via UE-specific power control and the like. Yet, reducing the ICI or reusing the ICI as a signal desired by a user equipment may be more preferable than lowering a frequency resource use per cell. To achieve this object, CoMP transmission schemes may be applicable.

The CoMP schemes applicable to a DL case may be mainly classified into joint processing (JP) scheme and coordinated scheduling/coordinated beamforming (CS/CB) scheme.

The JP scheme can use data at each transmission point (e.g., base station) of CoMP cooperation unit. And, the CoMP cooperation unit may mean a set of base stations used for the cooperative transmission scheme. Moreover, the JP scheme may be classified into a joint transmission scheme and a dynamic cell selection scheme.

The joint transmission scheme means a scheme of transmitting PDSCH from a plurality of transmission points (portion or all of CoMP cooperation unit) at a time. In particular, data transmitted to a single user equipment may be simultaneously from a plurality of transmission points. According to the joint transmission scheme, a quality of a coherently or non-coherently received signal can be improved and interference on another user equipment can be actively eliminated.

The dynamic cell selection scheme means the scheme of transmitting PDSCH from one transmission point (of CoMP cooperation unit) at a time. In particular, data transmitted to a single user equipment at a specific timing point is transmitted from one transmission point, the rest of transmission points in the cooperation unit at that timing point do not perform data transmission to the corresponding user equipment, and a transmission point of transmitting data to the corresponding user equipment may be dynamically selected.

According to the CS/CB scheme, CoMP cooperation units can cooperatively perform beamforming of data transmission to a single user equipment. In this case, although the data is transmitted from a serving cell only, user scheduling/beamforming may be determined by the coordination of cells of the corresponding CoMP cooperation unit.

Meanwhile, in case of uplink, coordinated multi-point reception means that a signal transmitted by coordination of a plurality of transmission points geographically spaced apart from each other is received. CoMP schemes applicable to a case of uplink may be classified into joint reception (JR) and coordinated scheduling/coordinated beamforming (CS/CB).

The JR scheme means that a signal transmitted on PUSCH is received by a plurality of reception transmission points. And, the CS/CB scheme means that user scheduling/beamforming is determined by coordination of cells of CoMP cooperation unit despite that PUSCH is received by one transmission point only.

If the above-mentioned CoMP system is used, a user equipment can be supported with data in common from a multi-cell base station. And, each base station is able to enhance system performance by supporting at least one user equipment at the same time using the same radio frequency resource. And, a base station may be able to perform SDMA (space division multiple access) based on channel state information between a base station and a user equipment.

In CoMP system, a serving base station and at least one cooperative base stations are connected to a scheduler via a backbone network. The scheduler can operate by receiving feedback of channel information on a channel state between each user equipment and a cooperative base station, which is measured by each base station, via the backbone network. For instance, the scheduler can schedule information on a cooperative MIMO operation on a serving base station and at least one cooperative base station. In particular, the scheduler can directly give an instruction on the cooperative MIMO operation to each base station.

As mentioned in the foregoing description, the CoMP system can be regarded as operating as a virtual MIMO system by binding a plurality of cells into a single group. Basically, a communication scheme of an MIMO system using multiple antennas may apply to the CoMP system.

Figure 6:
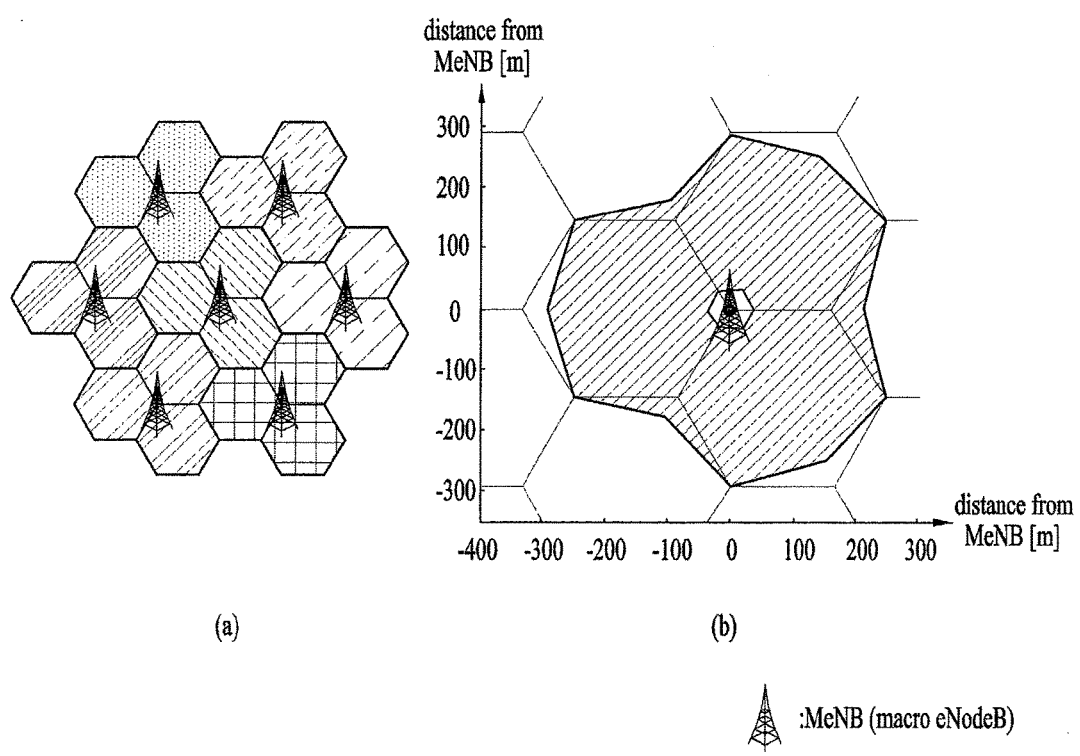
FIG. 6 including (a) and (b) is a diagram of 3-sector coverage applicable to transmission points of the present invention.

In the following description, in a heterogeneous network environment (HetNet) capable of cooperative transmission, for the overall enhancement of system throughput through enhancement of qualities of received signals of user equipments located on a cell edge, interference controls of the user equipments and the like, methods of installing a cell edge remote transmitting station (hereinafter abbreviated a remote transmitting station) on a cell edge area of a macro base station and managing/operating the remote transmitting station are disclosed. For clarity of the following description, assume that a cell area of a macro base station consists of 3 sectors shown in FIG. 6. The 3-sector cell area can be ideally represented as a cell area of a hexagonal shape shown in (a) FIG. 6. FIG. 6 in (a) shows a cell area determined depending on a size of a received signal per geo-location in case of applying vertical and horizontal beam patterns to an antenna of a macro base station.

Figure 7:
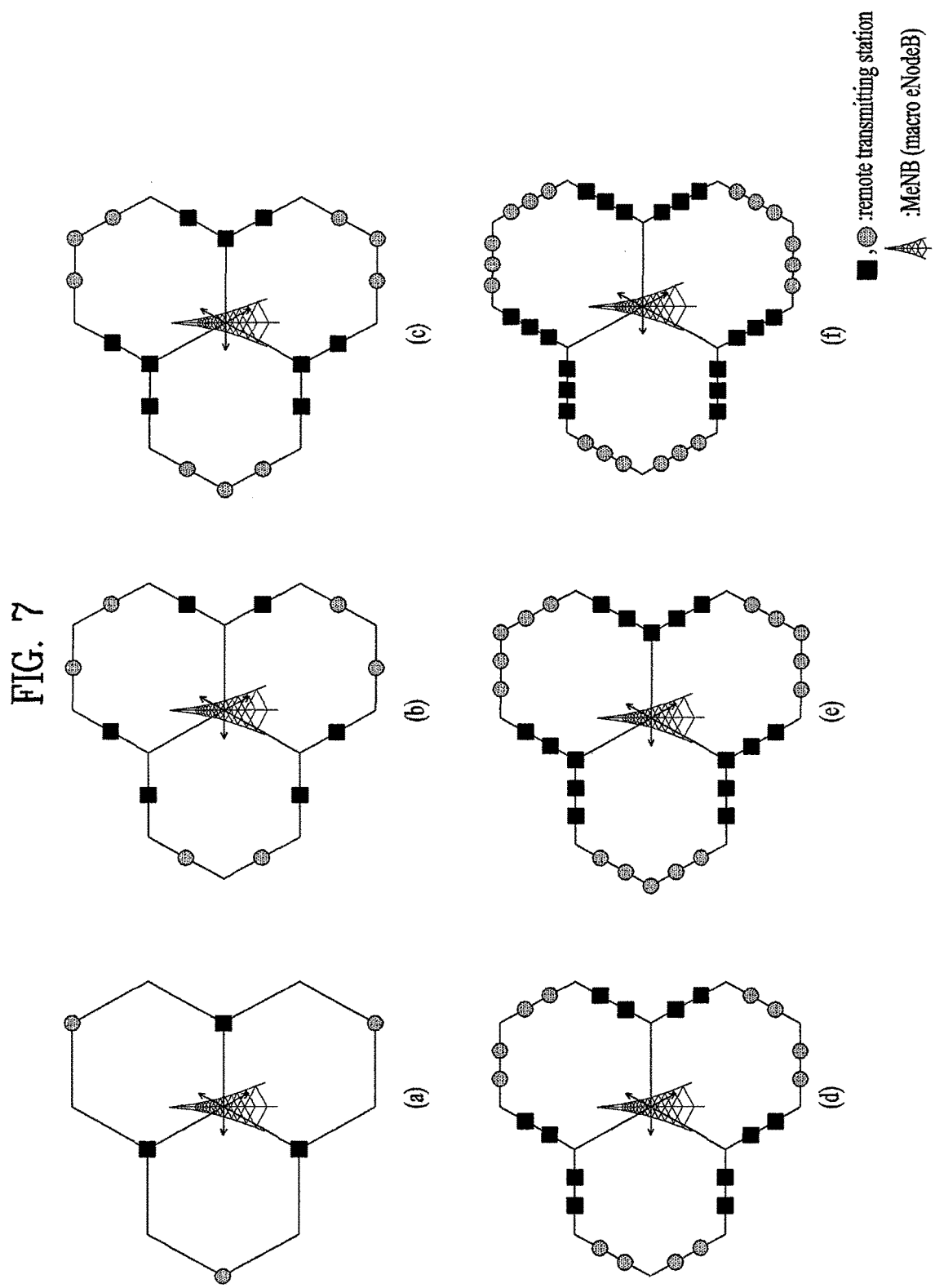
FIG. 7 including (a) and (b) is a diagram to describe deployments of remote transmitting stations according to the present invention.

The remote transmitting station mentioned in the description of the cell area of the macro base station shown in FIG. 6 can be located as shown in FIG. 7. In particular, FIG. 7 shows one example of deployment of remote transmitting stations on locations represented as circles or squares on a an edge area of a hexagonal sector coverage. FIGS. 7 in (a)-(f) shows examples of a method of installing 6 remote transmitting stations (N=1, 2, . . . 6) in uniform intervals. Yet, the number and/or locations of the remote transmitting stations shown in FIG. 7 are exemplarily provided.

Figure 8:
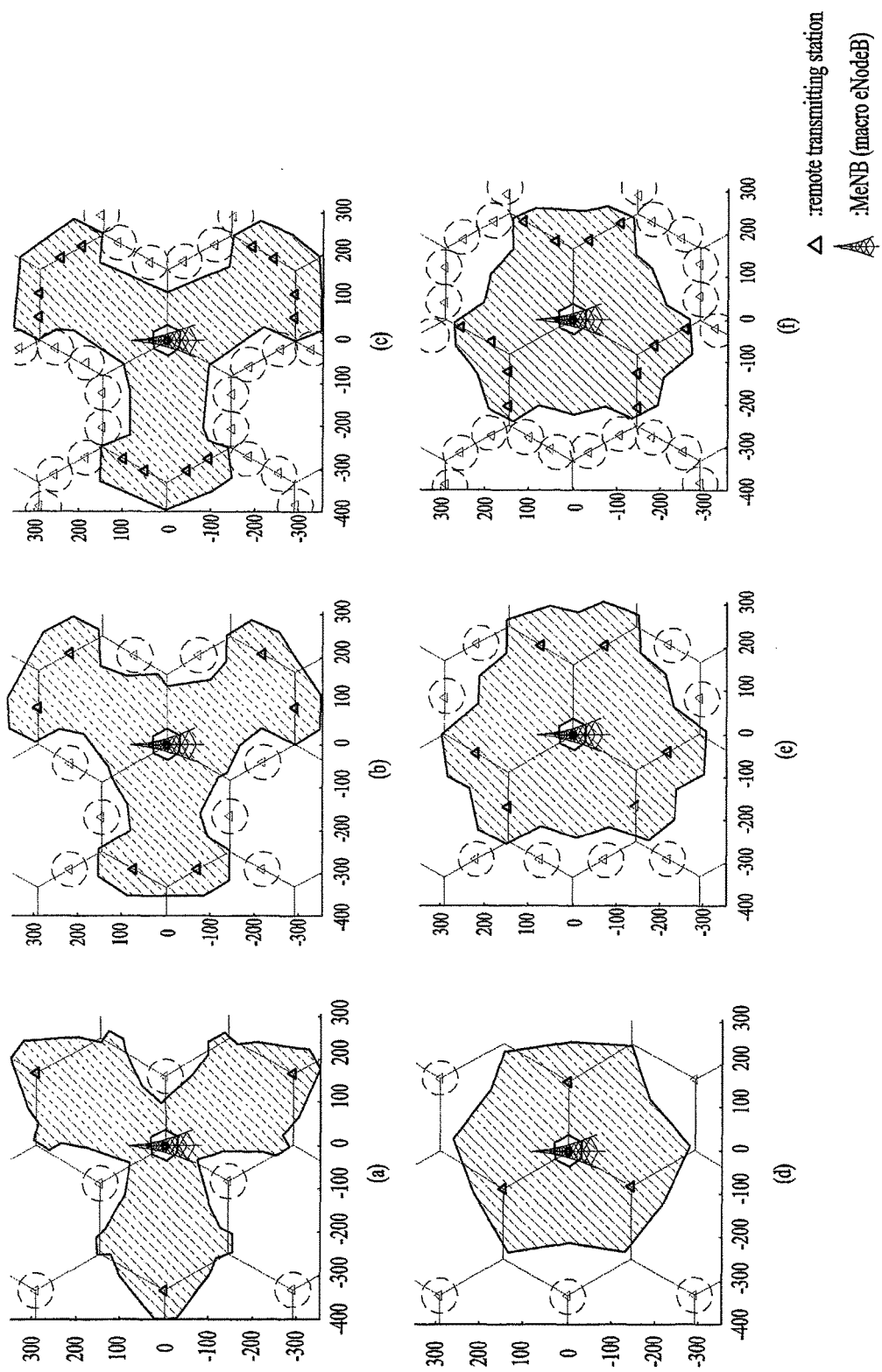
FIG. 8 including (a) to (f) is a diagram to show variations of transmission point coverages depending on examples of remote transmitting station deployment.

In case that the remote transmitting stations are deployed on the cell edge shown in FIG. 7, the coverage of the remote transmitting stations can be changed (extended) as shown in FIG. 8. In particular, FIG. 7 shows a case that a remote transmitting station transmits a signal of a macro base station connected to the corresponding remote transmitting station. FIG. 8 in (a)-(c) shows the coverages of the cases of the deployments of the remote transmitting stations at the locations represented as the circles shown in (a), (b), and (d) in FIG. 7, respectively. FIG. 8 in (d)-(f) shows the coverages of the cases of the deployments of the remote transmitting stations at the locations represented as the squares shown in (a), (b), and (d) FIG. 7, respectively.

In particular, as the remote transmitting station located on the edge of the macro base station is occupied by the corresponding macro base station (in this case, 'occupy' means that the remote transmitting station participates in the signal transmission by the macro base station), it is able to expect the reception quality enhancement of user equipments adjacent to the edge of the macro base station and the like.

Further, it is able to achieve variable macro cell coverage by enabling a remote transmitting station to be occupied by a macro base station for a specific time. This is described with reference to FIG. 9 as follows.

Figure 9:
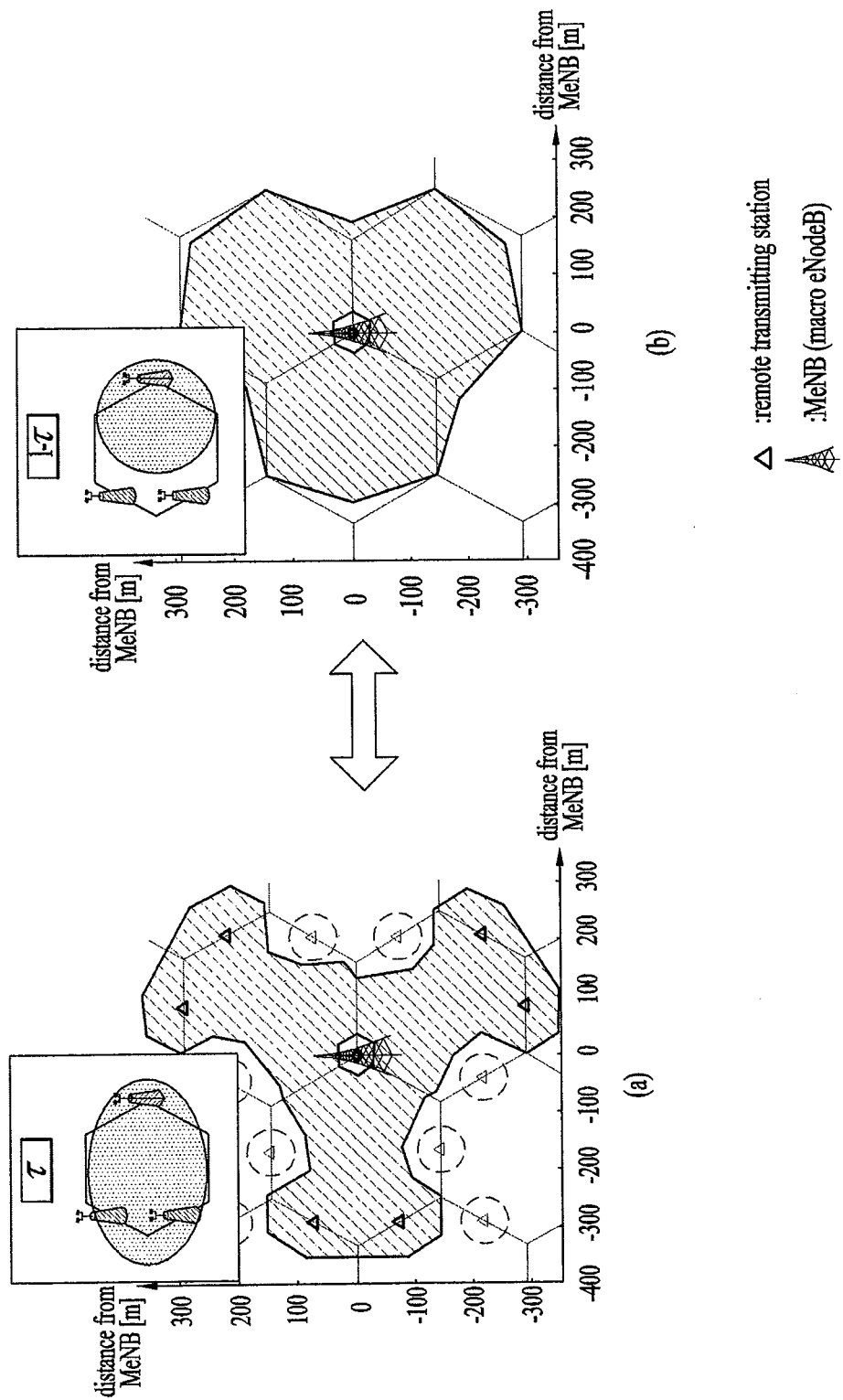
FIG. 9 including (a) and (b) is a diagram to describe variable cell coverages according to embodiments of the present invention.

Referring to FIG. 9, (a) in FIG. 9 shows that a remote transmitting station is occupied by a macro base station for a resource interval τ (i.e., one of a time interval, a frequency interval, a time/frequency interval, etc.). FIG. 9 in (b) shows that a remote transmitting station is not occupied by a macro base station for a resource interval (1-τ). In this case, remote transmitting stations not occupied by the macro base station may be entirely/partially occupied by another macro base station adjacent to the corresponding base station. So to speak, in case that a prescribed remote transmitting station is simultaneously connected to at least two adjacent macro base stations, the remote transmitting station is selectively participates in signal transmissions of at least one or more the macro base stations among the macro base stations connected to the corresponding remote transmitting station so that various kinds of variable cell coverage can be implemented.

The features of the above-described remote transmitting stations for the implementation of the variable macro cell coverage are summarized as follows. First of all, a remote transmitting station is installed on a coverage edge area formed by existing transmission points such as a macro base station and can be connected to the existing transmission point through a backhaul link of high performance and efficiency for minimizing influence on time delay and bandwidth limitation. The remote transmitting station is controlled for signal transmission and operation by an existing transmission point connected to the corresponding remote transmitting station, plays a role as a distributive antenna of the existing transmission point, or operates like a relay of transmitting the same signal of an antenna of the existing transmission point. If necessary, the remote transmitting station can operate as an additional independent antenna port retained by the existing transmission point. The remote transmitting station can perform a periodic or aperiodic transmission power change. Through this, the signal transmission of the remote transmitting station can be activated or deactivated. A transition interval for changing the transmission power may include an instantaneous or preset specific time interval. A multitude of adjacent existing transmission points can share a remote transmitting station. And, the corresponding remote transmitting station is able to transmit signals delivered by the transmission points, which share the corresponding remote transmitting station with each other, per time and frequency resource interval. To this end, a cell-edge remote transmitting station can change a cell identifier (ID) per time and frequency resource interval. A transmission point having a remote transmitting station can be used for sharing capacity of an adjacent cell or for adjusting a handover timing.

In the following description, signaling required for the above-mentioned variable coverage operation/management of a macro base station according to occupation of a remote transmitting station is explained. In the following description, a macro base station shall be named a $1^{st}$ transmission point and a macro base station sharing a cell edge with the $1^{st}$ transmission point shall be named a $2^{nd}$ transmission point. (Hence, the $2^{nd}$ transmission point can share at least one of remote transmitting stations located on the cell edge of the $1^{st}$ transmission point.)

The $1^{st}$ transmission point can signal information indicating that it will occupy a remote transmitting station for a prescribed time resource (e.g., a subframe, a radio frame, a subframe set, a radio frame set unit, etc.) to the $2^{nd}$ transmission point. In particular, the $1^{st}$ transmission point can transmit a time resource information, which is related to at least one remote transmitting station shared with the $2^{nd}$ transmission point among a plurality of remote transmitting stations located on a cell edge of the $1^{st}$ remote transmitting station, to the $2^{nd}$ transmission point. In this case, a cell identifier (cell ID) of the at least one remote transmitting station can be changed depending on a time interval indicated by the time resource information. For instance, if the time interval corresponds to a time interval in which the $1^{st}$ transmission point desires to occupy at least one remote transmitting station, the cell identifier of the at least one remote transmitting station can be set identical to that of the $1^{st}$ transmission point in the corresponding time interval. Moreover, the cell identifier of the at least one remote transmitting station can be set identical to that of the $2^{nd}$ transmission point in a whole or partial part of a time interval other than the former time interval. In this case, the time interval may be repeated by preset periods or may include an aperiodic specific time interval. In the above description, if a cell identifier of a remote transmitting station is set identical to that of a specific transmission point, it means that the remote transmitting station is occupied by the specific transmission point. Thus, at least one remote transmitting station occupied by a specific transmission point can play a role in transmitting the same signal transmitted by the specific transmission point, a role in performing a cooperative transmission as an antenna port of the specific transmission point, and the like.

The $1^{st}$ transmission point can deliver a time resource for scheduling a region to which interference is caused by a cell edge remote transmitting station or a time resource for not scheduling the same to the $2^{nd}$ transmission point. This can be used to indicate a time interval for the $2^{nd}$ transmission point to use a remote transmitting station.

The $1^{st}$ transmission point can transmit a time interval information for using/occupying remote transmitting stations belonging to an edge of the $1^{st}$ transmission point to other transmission points adjacent to the edge of the $1^{st}$ transmission point. This can be understood as the $1^{st}$ transmission point plays a role as a header transmission point for neighboring transmission points. In this viewpoint, the aforementioned two cases differ from each other in information delivery between two transmission points of which edges come in contact with each other. Thus, the time interval information for a plurality of transmission points to use/occupy the remote transmitting stations may be delivered to each of the transmission points via S1 interface and the like from a network node such as a gateway upper than the $1^{st}$ transmission point and the like.

In addition to the above description, the $1^{st}$ transmission point (or a network node such as a gateway and the like) for transmitting the time resource information may be able to transmit an information, which should be used for a signal transmission in each time resource, to the remote transmitting station.

In this information, a cell identifier, a PDSCH (or, E-PDCH, PDCCH) rate matching related information, a signal transmission information and the like can be included. In particular, the cell identifier means a cell identifier, which will be used for a signal transmission by a remote transmitting station, in the corresponding time resource information. In the PDSCH rate matching information, a CRS related information (e.g., CRS port number, shift information, MBSFN subframe set information, etc.), PDSCH (or, E-PDCCH, PDCCH) start OFDM symbol or PDCCH transmission symbol, a CSI-RS related information (e.g., zero power CSI-RS configuration or IMS configuration, non-zero power CSI-RS configuration) and the like can be included. In the signal transmission information, a channel state information such as RI, PMI, CQI and the like, a transmission mode, an antenna port number used for a signal transmission and the like can be included. In this case, the antenna port number may be applicable if the remote transmitting station works as a distributive antenna of the $1^{st}$ transmission point. And, the $1^{st}$ transmission point may be able to deliver the information for enabling a transmission to be performed using a specific antenna port number or a specific layer only.

The $1^{st}$ transmission point can instruct an antenna-specific CSI reporting information to a user equipment. In particular, a base station can instruct a user equipment to make a channel state reporting for a specific antenna port or an antenna port group separately. For instance, if a remote transmitting station operates as a distributive antenna of a transmission point, i.e., if the remote transmitting station plays a role as an antenna port 9 and an antenna port 10, it is able to instruct that a channel state reporting for the antenna port 9 and the antenna port 10 should be made separately from a channel state reporting for other antennas.

In the following description, methods of operating/managing a remote transmitting station are explained with reference to FIG. 10 and FIG. 11. In the following description, assume the three items as follows. First of all, i) antennas of a remote transmitting station correspond to distributive antennas of a macro base station to which the remote transmitting station is connected and work as independent antenna ports, respectively. Secondly, ii) all antenna ports dependent on a macro base station participate in signal transmission cooperatively by including antennas of a remote transmitting station. Thirdly, iii) macro base stations retain the same number of remote transmitting stations. All remote transmitting stations participate in signal transmission periodically in a resource interval τ by matching synchronization but do not participate in the signal transmission in a resource interval (τ−1).

Figure 10:
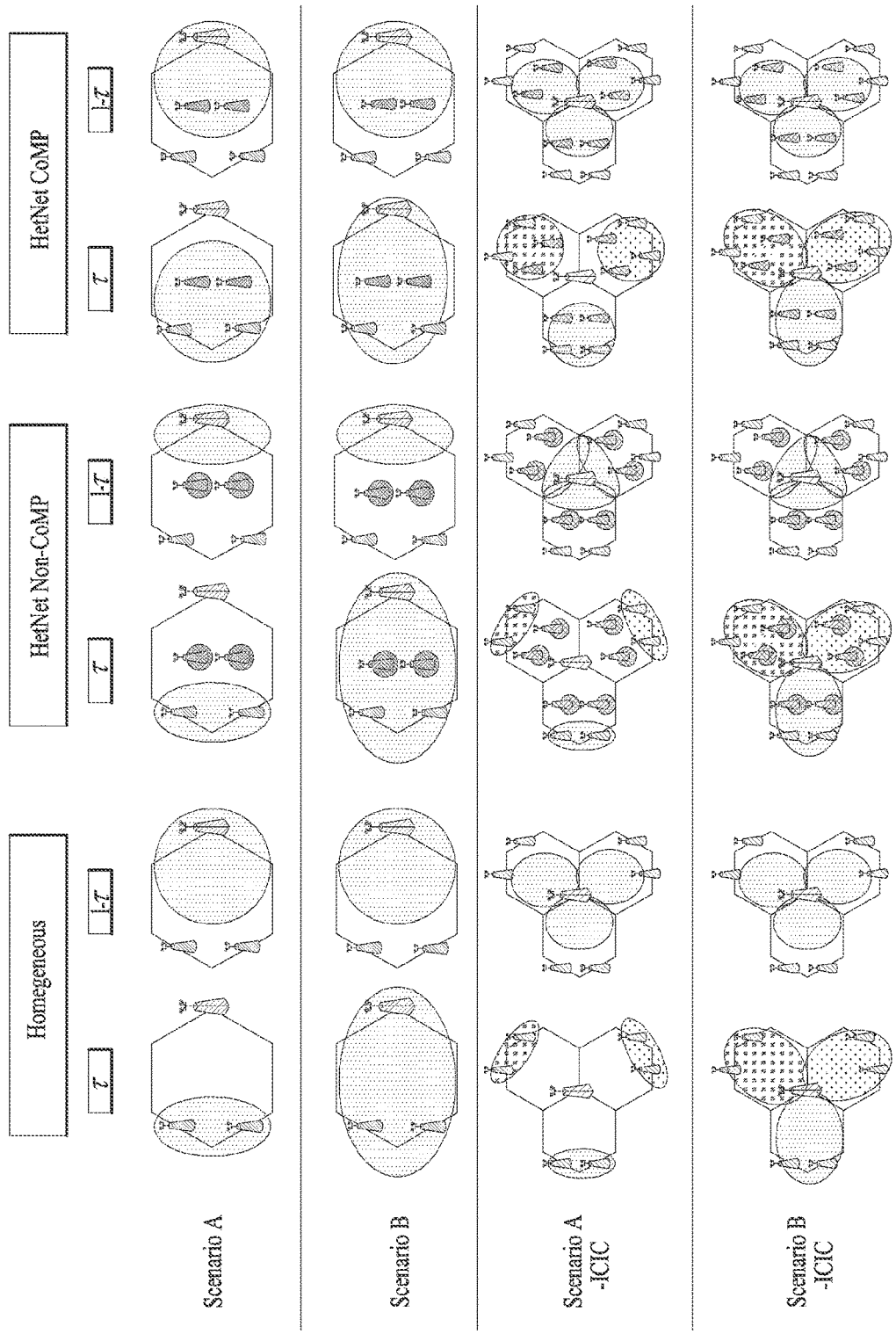
FIG. 10 and FIG. 11 are diagrams to describe methods of operating a remote transmitting station according to other embodiments of the present invention.
Figure 11:
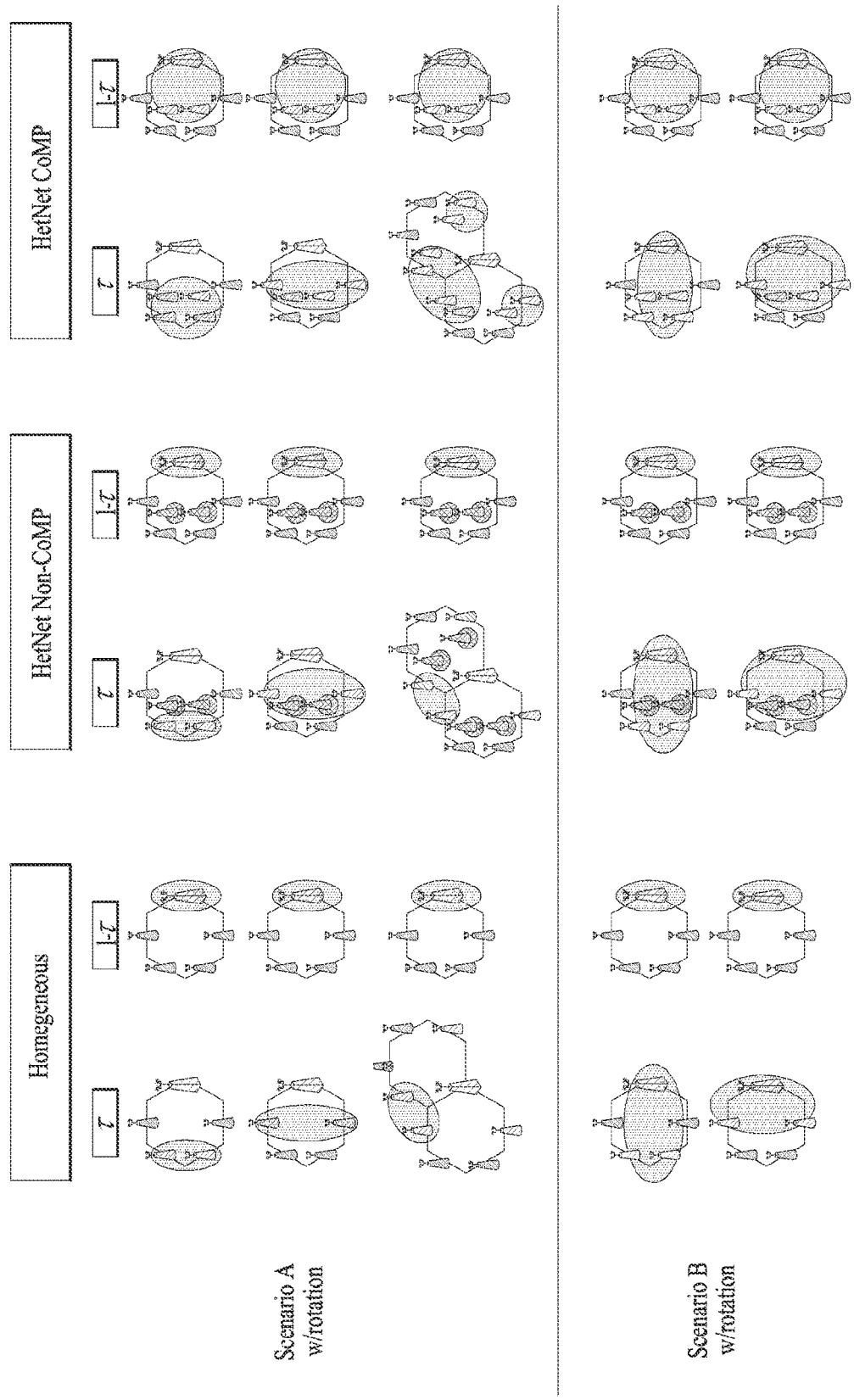

Firstly, in Scenario A shown in FIG. 10, antenna ports retained by remote transmitting stations and antenna ports retained by an existing macro base station can transmit signals independently in resource intervals separate from each other, respectively. In particular, in a resource interval τ, a remote transmitting station is responsible for a signal transmission of a macro base station but existing antenna ports do not transmit signals. In the rest of a resource interval (1−τ), they can operated by switching their roles to each other.

Secondly, in Scenario B, antenna ports retained by remote transmitting stations are added to existing antenna ports retained by a macro base station and the corresponding antennas can transmit signals together. In particular, in a resource interval τ, the antenna ports of the remote transmitting stations and the existing antenna ports of the macro base station cooperatively transmit signals together. In the rest of a resource interval (1−τ), the existing antenna ports of the macro base station participate in the signal transmission only.

Thirdly, in Scenario A-ICIC, which is similar to Scenario A, it is characterized in that remote transmitting stations of 3 sectors transmit signals in resource intervals independent from each other in a resource interval τ. In particular, the remote transmitting stations belonging to a macro base station transmit signals by occupying a resource interval amounting to τ/3 only to avoid overlapping in each sector. Through this, it is able to mitigate interference possibly caused to the remote transmitting stations between adjacent sectors.

Fourthly, regarding Scenario B-ICIC, basic contents of Scenario B-ICIC is basically identical to that of Scenario B.

And, Scenario B-ICIC is characterized in that remote transmitting stations occupy a resource interval of τ/3 per sector only like Scenario A-ICIC.

Subsequently, referring to FIG. 11, fifthly, Scenario A with rotation shows a case that a cell edge remote transmitting station is simultaneously connected to a multitude of adjacent macro base stations. FIG. 11 shows one example of a configuration of 3 cooperative transmission point clusters that can be retained by a remote transmitting station simultaneously connected to a macro base station responsible for 3 adjacent sectors. Hence, in this case, through negotiation between adjacent macro base stations, a specific remote transmitting station can be selectively included in one of 3 configurable cooperative clusters. This scenario is identical to Scenario A shown in FIG. 10 in that antenna ports of a macro base station and antenna ports of a cell edge remote transmitting station participate in signal transmission within an independent resource interval. Yet, in case of applying rotation, this scenario is characterized in implementing a more dynamic variable cell coverage by utilizing four kinds of different cell coverage areas depending on a presence or non-presence of activation of the cell edge remote transmitting station and a type of the participating cooperative transmission point cluster.

Sixthly, in Scenario B with rotation, a remote transmitting station is simultaneously connected to two adjacent macro base stations. Hence, a specific remote transmitting station can be selectively included in one of two configurable cooperative clusters through negotiation between the adjacent macro base stations. This scenario is identical to Scenario B in that an antenna port of a macro base station always participate in signal transmission but a cell edge remote transmitting station participates in signal transmission only in a resource interval of τ. Yet, in case of applying rotation, a cell coverage area can be operated in a manner of being dynamically changed.

Figure 12:
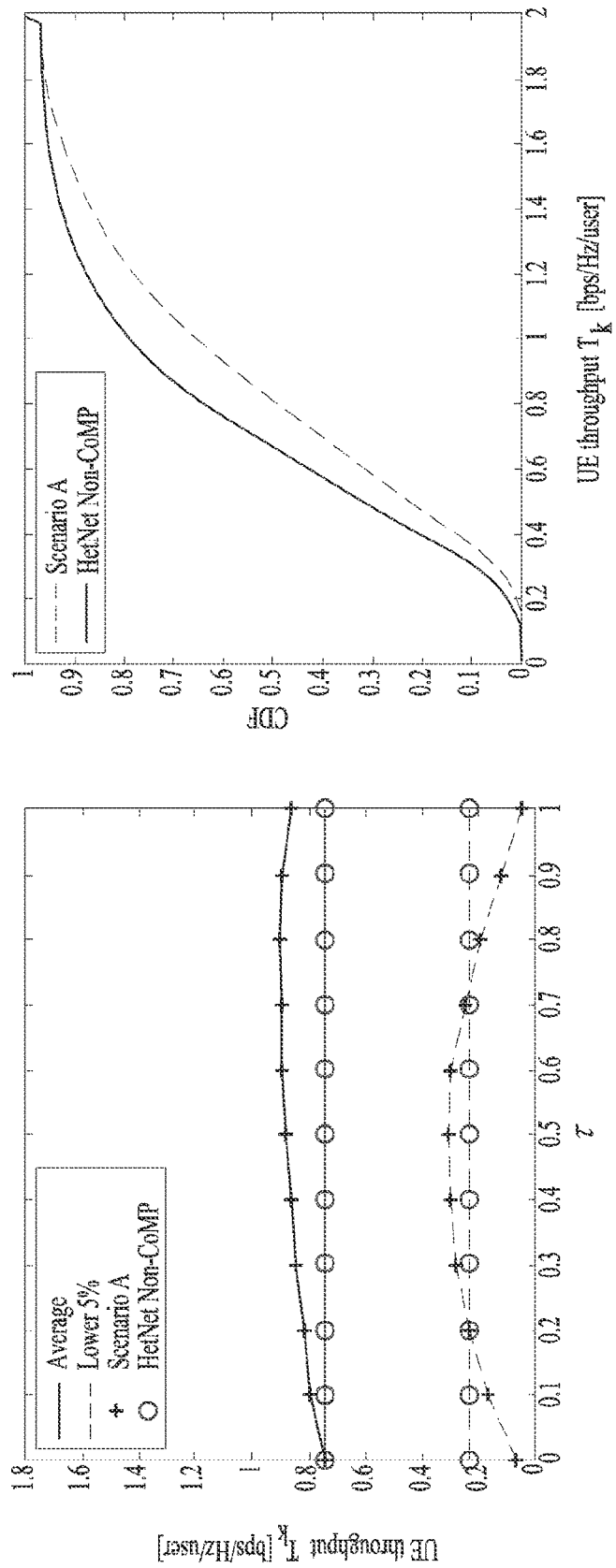
FIGS. 12 to 14 are diagrams to show performance test results of embodiments shown in FIG. 10 and FIG. 11.
Figure 13:
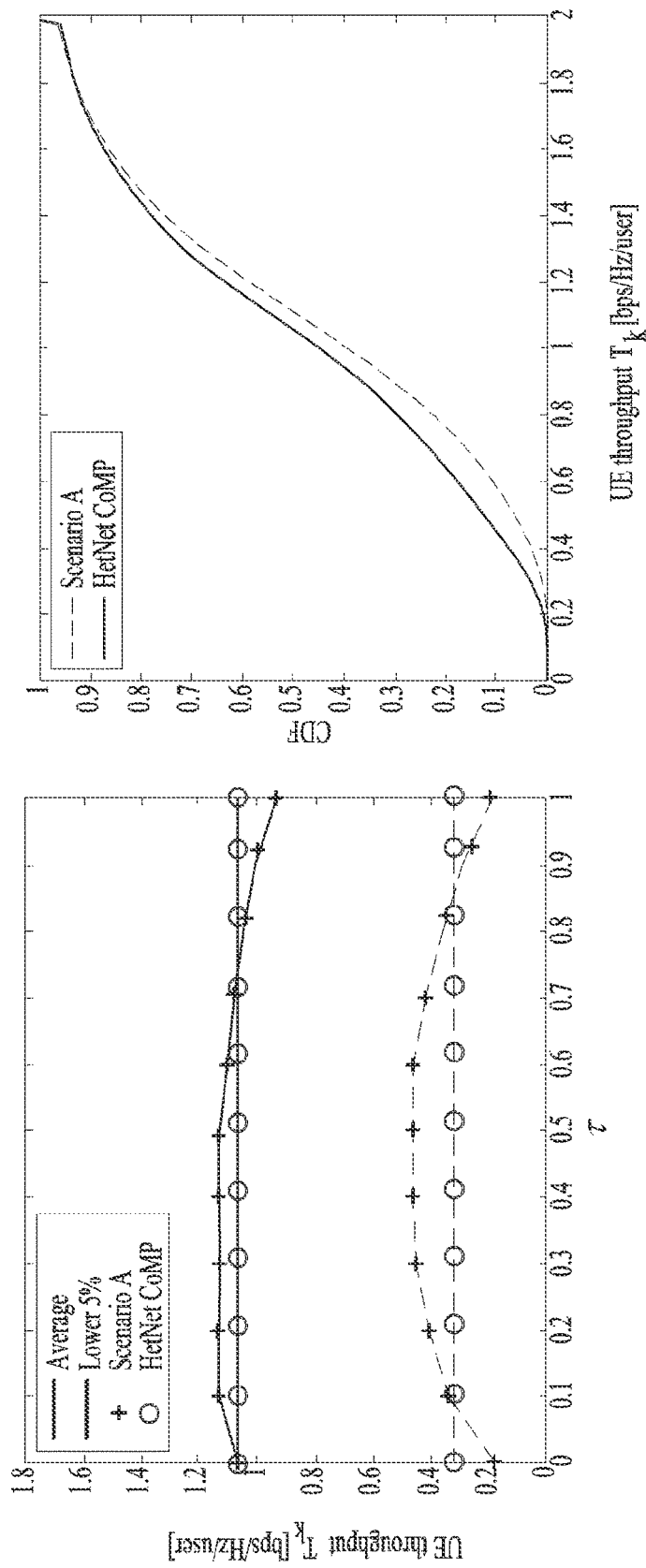
Figure 14:
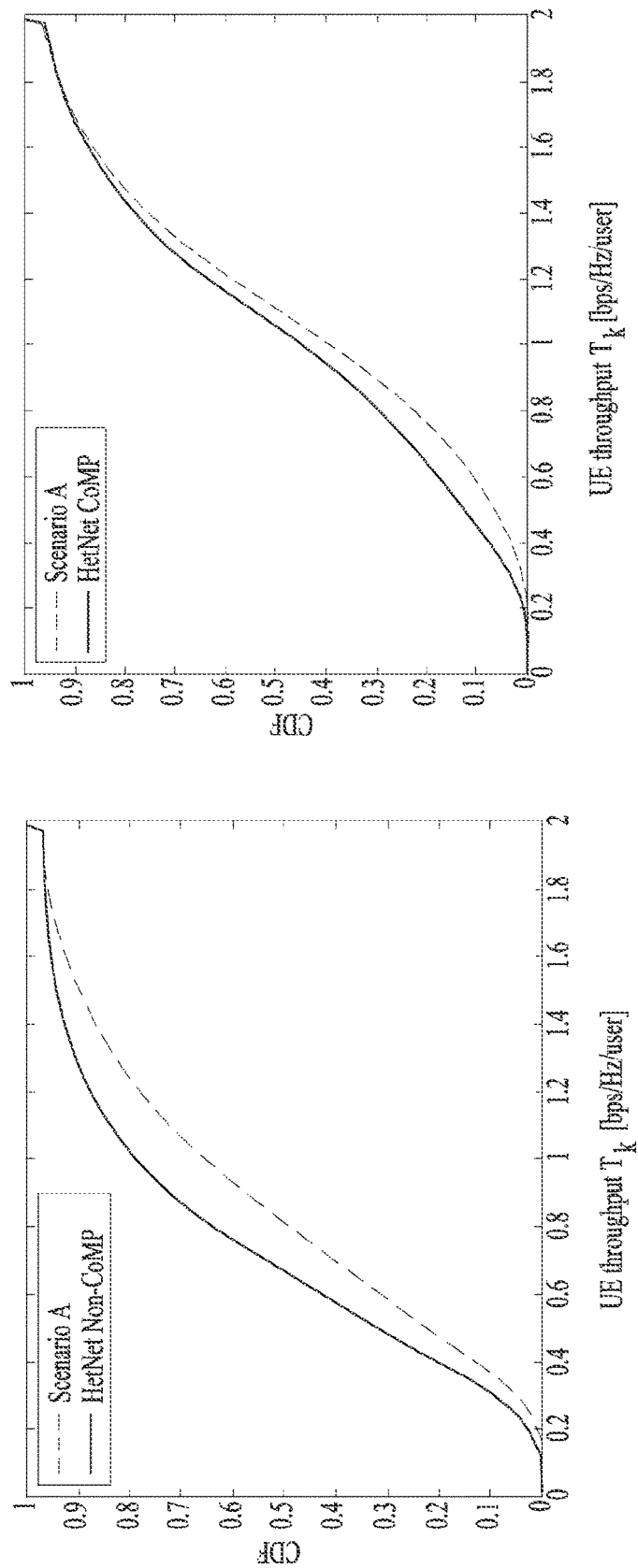

FIGS. 12 to 14 are diagrams to show performance test results to check performance gains for the aforementioned scenarios. Detailed text parameters are shown in Table 1. Remote transmitting stations (N=2) are used per sector and their locations correspond to the locations of the circles shown in (b) of FIG. 7.

TABLE 1

| | |
|---|---|
| Height of transmission point (Tx node height) | Macro BS: 25 m (UMa model reference) RRH: 10 m (UMi model references) |
| Transmission power & noise | Macro BS: 46 dBm (10 MHz reference) RRH: 30 dBm (FDD reference) A WGN power: −104 dBm (10 MHz reference) |
| No. of transmitting antennas | MBS + 4 MRRH = 2 |
| No. of UE antennas | MUE = 1 |
| No. of hot spots | Nhot-spot = 2 |
| Beam pattern | Macro BS: 3D model (horizontal & vertical pattern) RRH: 2D model (vertical pattern only) |
| Transmission point deployment | UE per sector in 19-cell 3-sector BS environment (inter-BS distance of 500 m): UEs of 2/# of Photspot in 30 Kaud are uniformly distributed in a radius of 10~40 m from each RRH. |

In FIG. 12, performance of a proposed operating method is compared to that of an existing system represented as 'HetNet Non-CoMP'. Scenario A among system operating methods is utilized for performance evaluation. And, an operating method title is identically represented in the performance evaluation result. In (a) of FIG. 12, an average of a transmission rate per user and a value of lower 5% are shown together by changing a value τ that is utilization frequency of a remote transmitting station. As a result, in case of 'τ=0.5', it can be observed that performance gain of lower users reaches a maximum. And, a cumulative distribution function (CDF) of a per-user transmission rate of this case is shown in (b) of FIG. 12. Comparing to an existing system, the proposed method shows performance gain of 29% with reference to lower 5% users and also shows performance gain of 18% in aspect of an average transmission rate. Therefore, it is confirmed that the proposal of the present invention can expect an effect of overall performance improvement of a system as well as performance improvement of lower users.

In FIG. 13, in the environment 'HetNet CoMP', performance of the proposed operating method 'Scenario A' is compared to that of an existing system. In the environment 'HetNet CoMP', performance of an existing system is considerably improved in comparison with that in the situation 'HetNet non-CoMP' due to the cooperative signal transmission participation of remote transmitting stations that control hot-spots. In this case, it can be also observed that the application of the proposed method considerably helps the improvement of overall system performance as well as the lower users from the text result (performance gain 42% up with reference to lower users, performance gain 6% up with reference to average transmission rate).

In FIG. 14, it is able to observe a performance improvement effect when the proposed method 'Scenario A with rotation' is additionally applied to two kinds of the existing systems 'HetNet Non-CoMP and HetNet CoMP' in the environment 'HetNet'. As a specific remote transmitting station is connected to a multitude of macro base stations, as shown in FIG. 11, if it is possible to selectively participate in various cooperative transmission point clusters, the proposed method 'Scenario A with rotation' brings performance gain 55% up with reference to lower users and performance gain 19% up with reference to average transmission rate in comparison with the existing system 'Het Non-CoMP'. And, the proposed method 'Scenario A with rotation' also brings performance gain 49% up with reference to lower users and performance gain 8% up with reference to average transmission rate in comparison with the existing system 'Het CoMP'. If this is compared to the case of not applying rotation, additional performance gain 26% up with reference to lower users and additional performance gain 7% up with reference to lower users are generated from the environment 'HetNet Non-CoMP' and the environment 'HetNet CoMP', respectively.

In Table 2, results from comparing performance of the proposed methods in more various system environments (e.g., homogeneous, HetNet Non-CoMP, and HetNet CoMP) to that of an existing system are summarized.

TABLE 2

| | Homogeneous | HetNet Non-CoMP | HetNet CoMP |
|---|---|---|---|
| Scenario A | 151% | 129% | 142% |
| | 101% (ICIC) | 155% (rotation) | 149% (rotation) |
| Scenario B | 180% | 134% | 148% |
| | 161% (ICIC) | 150% (rotation) | 163% (rotation) |

In Table 2, a lower user transmission rate is taken as a reference. A proposed numeral value indicates a value represented by converting performance of the proposed methods relative to that of an existing system into percentage. When operating methods appropriate for the three kinds of the considered environments are selected, it is able to achieve performances of maximum 180%, 155% and 163%, respectively. In particular, if the operating method with rotation, which utilizes a cell edge remote transmitting station connected to a multitude of inter-cell macro base stations, is applied, it is able to obtain additional performance gain amounting to 7% to 26% more than that of the case of not applying the corresponding operating method.

Figure 15:
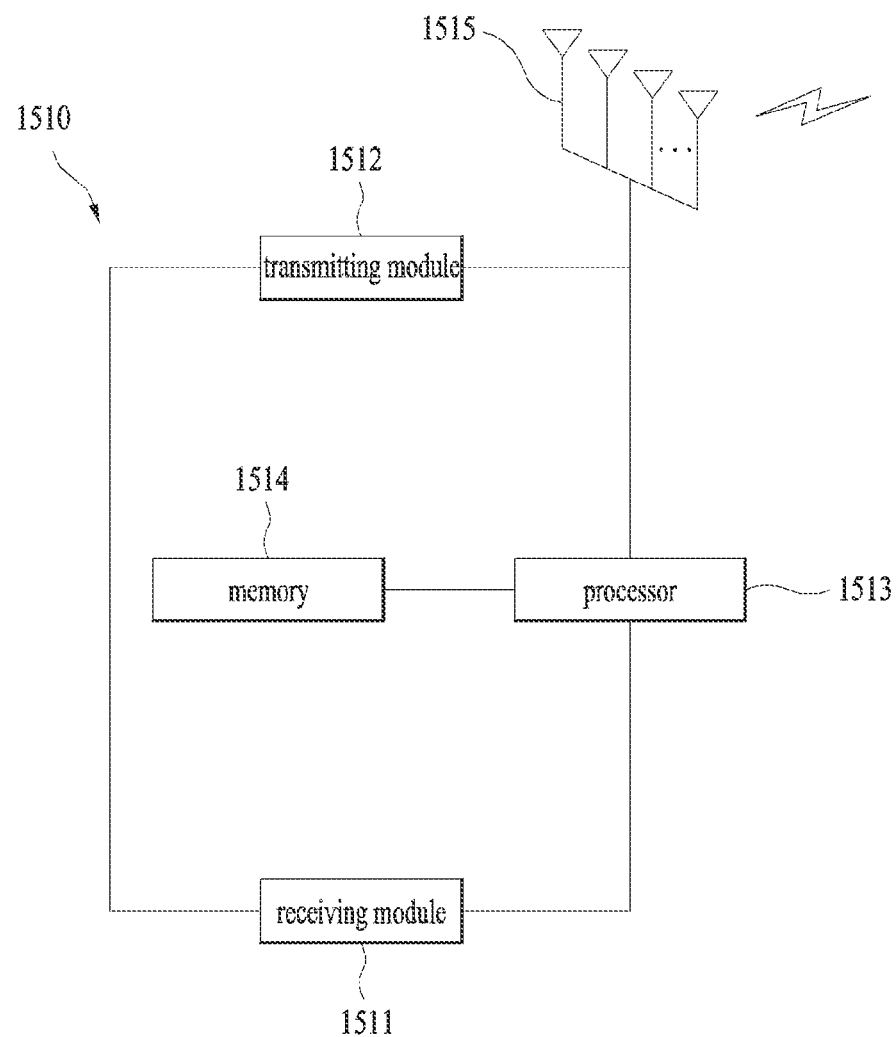
FIG. 15 is a diagram for a configuration of a transmission point device according to an embodiment of the present invention.

FIG. 15 is a diagram for a configuration of a transmission point device according to an embodiment of the present invention.

Referring to FIG. 15, a transmission point device 1510 according to the present invention may include a receiving module 1511, a transmitting module 1512, a processor 1513, a memory 1514 and a plurality of antennas 1515. In this case, a plurality of the antennas 1515 may mean a transmission point device that supports MIMO transmission and reception. The receiving module 1511 may be able to receive various signals, data, information and the like in uplink from a user equipment. The transmitting module 1512 may be able to transmit various signals, data, information and the like in DL to the user equipment. Moreover, the processor 1513 may be configured to control overall operations of the transmission point device 1510.

The processor 1513 of the transmission point device 1510 according to one embodiment of the present invention can handle and/or process the particulars, matters and facts mentioned in the foregoing description.

The processor 1513 of the transmission point device 1510 performs a function of operating information received by the transmission point device 1510, information to be externally transmitted, and the like. The memory 1514 may store the operated information and the like for prescribed duration and may be substituted with such a component as a buffer (not shown in the drawing) and the like.

The detailed configuration of the transmission point device mentioned in the above description may be implemented in a manner that the matters of the various embodiments of the present invention mentioned in the foregoing description are independently applicable or that at least two of the various embodiments of the present invention are simultaneously applicable. And, duplicate contents may be omitted for clarity.

Embodiments of the present invention may be implemented using various means. For instance, embodiments of the present invention can be implemented using hardware, firmware, software and/or any combinations thereof.

In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

The embodiments of the present invention mentioned in the foregoing description can apply to various kinds of mobile communication systems.

What is claimed is:

1. A method of controlling a remote transmitting station by a first macro base station in a heterogeneous network wireless communication system including the first macro base station, a second macro base station, and a plurality of remote transmitting stations which are implemented as micro base stations, the method comprising:
   transmitting, to the second macro base station, time resource information which indicates a first time interval within a preset time period;
   transmitting, to at least one remote transmitting station which has a cell identifier identical with a cell identifier of the first macro base station, a request for the at least one remote transmitting station to transmit a signal to a user equipment during the first time interval within the preset time period; and
   transmitting the signal to the at least one remote transmitting station during the first time interval within the preset time period,
   wherein the at least one remote transmitting station is located on a cell edge shared by the first macro base station and the second macro base station, and
   wherein the cell identifier of the at least one remote transmitting station is periodically set to be identical with the cell identifier of the first macro base station during the first time interval within the preset time period, and set to be identical with a cell identifier of the second macro base station during a second time interval other than the first time interval within the preset time period.

2. The method of claim 1, wherein the first macro base station transmits the cell identifier of the first macro base station to the at least one remote transmitting station.

3. The method of claim 1, wherein the first and second time intervals are repeated by the preset time period.

4. The method of claim 1, wherein the first macro base station further transmits at least one of information related to a transmission of a physical downlink shared channel and signal transmission information to the at least one remote transmitting station.

5. The method of claim 4, wherein the information related to the physical downlink shared channel comprises at least one of a cell-specific reference signal related information of the first macro base station, a start orthogonal frequency division multiplexing (OFDM) symbol or channel state information reference signal related information of a control channel.

6. The method of claim 4, wherein the signal transmission information comprises at least one of channel state information, transmission mode information or antenna port information.

7. The method of claim 1, wherein if the at least one remote transmitting station performs a joint transmission with the first macro base station, the first macro base station transmits information on an antenna port to be used by the at least one remote transmitting station.

8. The method of claim 7, wherein the first macro base station instructs the user equipment adjacent to the at least one remote transmitting station to separately perform a channel state reporting for the antenna port to be used by the at least one remote transmitting station.

9. A first macro base station in a heterogeneous network wireless communication system including the first macro base station, a second macro base station, and a plurality of remote transmitting stations which are implemented as micro base stations, the first macro base station comprising:
a transmitting module; and
a processor,
wherein the processor is configured to:
transmit, to the second macro base station, time resource information which indicates a first time interval within a preset time period,
transmit, to at least one remote transmitting station which has a cell identifier identical with a cell identifier of the first macro base station, a request for the at least one remote transmitting station to transmit a signal to a user equipment during the first time interval within the preset time period, and
transmit the signal to the at least one remote transmitting station during the first time interval, within the preset time period,
wherein the at least one remote transmitting station is located on a cell edge shared by the first macro base station and the second macro base station, and
wherein the cell identifier of the at least one remote transmitting station is periodically set to be identical with the cell identifier of the first macro base station during the first time interval within the preset time period, and set to be identical with a cell identifier of the second macro base station during a second time interval other than the first time interval within the preset time period.

* * * * *